Patented Jan. 30, 1951

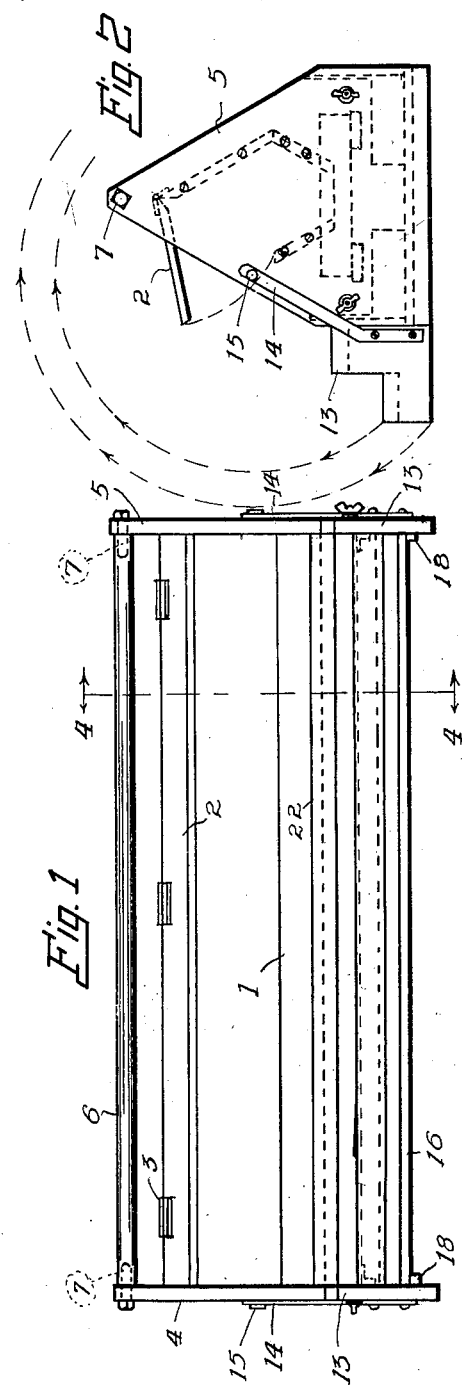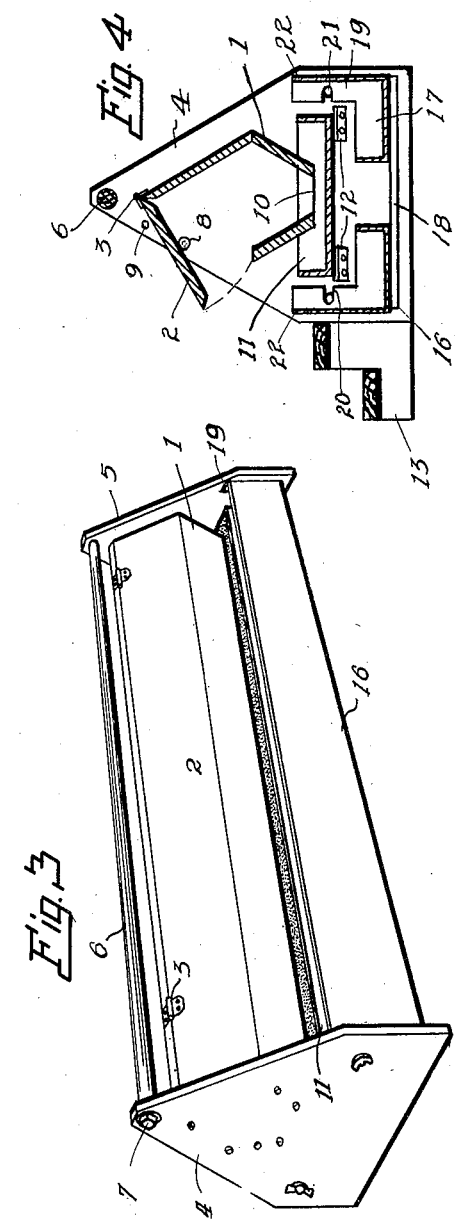
ROY E. FLOCH
Inventor
By Smith & Wells
Attorneys

2,539,536

UNITED STATES PATENT OFFICE 2,539,536

POULTRY FEEDER

Roy E. Floch, Anatone, Wash.

Application August 23, 1945, Serial No. 612,229

2 Claims. (Cl. 119—52)

The present invention relates to an improved poultry feeder especially adapted for use by chickens, and designed primarily for preventing waste of the feed by the chickens while feeding from a feed tray. As is well known, when the chickens are pecking at and feeding from the feed tray or hopper they drop from their beaks a large percentage of the granular or powdered food, which falls upon the ground or floor, and this dropped food is either wasted, or becomes contaminated and unsanitary for further use as chicken feed.

In carrying out my invention I provide the feed tray with collecting pans or troughs located in position to receive and retain the dropped food, and means are provided whereby the collected food may with convenience be returned to the feeding tray for consumption.

The invention consists in certain novel combinations and arrangements of parts involving the feed hopper and its tray together with removable collecting pans or troughs, which are embodied in a compactly arranged feeding appliance that is simple in construction and economical in the performance of its functions.

In the accompanying drawings I have illustrated one complete example of the physical embodiment of my invention wherein the parts are combined and arranged according to one mode I have thus far devised for the practical application of the principles of my invention, but it will be understood that changes may be made in these exemplifying drawings, within the scope of my appended claims, without departing from the principles of the invention.

Figure 1 is a view in front elevation of a poultry feeder embodying my invention.

Figure 2 is an end elevation of the feeder looking to the right in Fig. 1.

Figure 3 is a perspective view of the feeder without the steps.

Figure 4 is a vertical transverse sectional view of the feeder as at line 4—4 of Figure 1.

As indicated in the drawings, the hopper 1, which is preferably of diamond shape in cross section and provided with a lid or cover 2 that is hinged at 3, is supported at its ends by the two end walls or heads 4 and 5 to form a rigid structure. An upper brace rod or bar 6 also connects these end walls and, to prevent the chickens from roosting on this handle bar, it is provided with loosely journaled bearings as 7 in the end walls, which permit the bar to revolve and thus afford only a precarious footing for the chickens.

The hinged door 2 may be supported in open position by any suitable means, as for instance by removable supporting pins 8 that are inserted in selected sockets 9 provided in the opposite end walls 4 and 5, and the hopper is fashioned with a usual lower discharge mouth 10 for the food to pass through and fall into a feeding tray 11.

The feeding tray, which is of rectangular shape and shallow in depth, is supported close to and centrally of the longitudinally extending mouth of the hopper, on cleats or bars 12 fastened on the inner faces of the two end walls, and the feed tray may with convenience be withdrawn for cleansing and sanitary maintenance.

The chickens, as usual, feed from the tray through the uncovered opening at the front of the hopper, and for accommodation of smaller chickens a pair of steps 13 are provided. The steps extend the full length of the feeder, and they are provided with end straps 14 hinged to the end walls 4 and 5 at 15, in order that the steps may be swung away from the operative position of Fig. 4, as indicated by the arrows and dotted lines in Fig. 2, when not required for use.

The larger chickens may feed at either the front or rear sides of the hopper and tray, and for the purpose of catching any dropped food that would otherwise be wasted, I provide two detachable and removable collecting pans or troughs 16 and 17 best seen in Fig. 4. These collecting pans are each located beneath an edge of the feed tray, in position to catch the food dropped by a chicken as it feeds from the feed tray.

The shallow, rectangular pans are supported at their opposite ends on cleats or bars 18 that are secured by nails or screws to the inner faces of the end walls of the hopper, and end flanges 19 of the collecting pans are notched at 20 to engage retaining pins 21 mounted on the inner faces of the end walls, which prevent dislocation of the collecting pans.

To prevent escape of the feed as it falls toward the two collecting pans, each pan is fashioned with a a vertical outer wall 22 which performs the functions of a guard and guide to insure deposit of the falling feed into the collecting pans. When the collecting pans have accumulated a sufficient quantity of feed they are emptied and their contents returned to the feeding tray 11, or the hopper 1.

The feeding tray and the pans may readily be slipped out of, and into, the feeder, for convenience in supplying the feed, cleaning the tray and pans, and for returning the collected feed to the feed tray.

As best seen in Fig. 4, the feeding tray is located beneath the discharge mouth of the hopper, and the two collecting pans are located, one each beneath the side corner or lateral edge of the feeding tray to receive the food dropped over an edge; and the guard walls 22 of the pans extend upwardly and terminate a little above the lateral edges of the feeding tray, in order that a maximum quantity of the dropped food may be recovered and collected in the pans.

Having thus fully described my invention, what I claim as new and desire to secure by Letters Patent is:

1. In a poultry feeder, spaced apart end walls adapted to rest upon the ground or the floor to support the feeder, inclined hopper side walls secured to and rigidly connecting said end walls, cleats fastened to the end walls below the side walls, a feed tray removably seated on said cleats, additional cleats on said end walls below the feed pan cleats, a pair of feed catching pans removably seated upon said additional cleats, and stop pins in the end walls engaging said feed catching pans to limit their inward movement, said feed catching pans having outer baffle plates extending upwardly to the level of the top of the feed tray to serve as outside walls and to deflect flying particles of food down into the feed catching pans.

2. In a poultry feeder, spaced apart end walls, a feed hopper rigidly connecting said end walls, a carrying handle rotatably mounted on said end walls above the feed hopper, a rotating two stage step pivoted on the end walls to swing between a position alongside the end walls and a position above the end walls, a removable feed tray supported by said end walls below the hopper and removable catch pans supported by said end walls below the feed tray, thereby providing a sanitary poultry feeder from which all the lower parts can be removed for thorough and speedy cleaning.

ROY E. FLOCH.

REFERENCES CITED

The following references are of record in the file of this patent:

UNITED STATES PATENTS

| Number | Name | Date |
|---|---|---|
| 9,244 | Albee | Sept. 7, 1852 |
| 795,589 | Dowell | July 25, 1905 |
| 928,400 | Poh | July 20, 1909 |
| 1,062,610 | Schisler | May 27, 1913 |
| 1,102,004 | Conboie | June 30, 1914 |
| 1,125,044 | Beane | Jan. 19, 1915 |
| 1,176,256 | Trompen et al. | Mar. 21, 1916 |
| 1,335,424 | Brown | Mar. 30, 1920 |
| 1,340,869 | Ashley | May 25, 1920 |
| 1,410,689 | McCurdy | Mar. 28, 1922 |
| 1,444,428 | Robbins | Feb. 6, 1923 |
| 1,507,795 | Rockey | Sept. 9, 1924 |
| 1,546,241 | Karasuda | July 14, 1925 |
| 1,575,629 | Jenkins | Mar. 9, 1926 |
| 1,587,548 | Olson | June 8, 1926 |
| 1,632,738 | Lord | June 14, 1927 |
| 1,644,263 | Moellring | Oct. 4, 1927 |
| 1,810,230 | Thumann | Jan. 21, 1929 |
| 1,878,555 | Uhrik | Sept. 25, 1931 |
| 1,890,778 | German | Dec. 13, 1932 |
| 1,922,435 | Harris | Aug. 15, 1933 |